United States Patent
Chen

(10) Patent No.: US 12,308,873 B2
(45) Date of Patent: May 20, 2025

(54) WIRELESS SIGNAL RECEIVING DEVICE AND SYSTEM

(71) Applicant: GETAC TECHNOLOGY CORPORATION, New Taipei (TW)

(72) Inventor: Kuan-Yu Chen, Taipei (TW)

(73) Assignee: Getac Technology Corporation, New Taipei (TW)

( * ) Notice: Subject to any disclaimer, the term of this patent is extended or adjusted under 35 U.S.C. 154(b) by 402 days.

(21) Appl. No.: 17/963,068

(22) Filed: Oct. 10, 2022

(65) Prior Publication Data

US 2023/0118420 A1   Apr. 20, 2023

Related U.S. Application Data

(60) Provisional application No. 63/255,866, filed on Oct. 14, 2021.

(51) Int. Cl.
*H04B 1/18* (2006.01)
*H04B 1/00* (2006.01)
(Continued)

(52) U.S. Cl.
CPC ............ *H04B 1/18* (2013.01); *H04B 1/0057* (2013.01); *H04B 1/0064* (2013.01); *H04B 1/16* (2013.01);
(Continued)

(58) Field of Classification Search
CPC ...... H04B 1/18; H04B 1/0057; H04B 1/0064; H04B 1/16; H04B 1/3805; H04B 2001/3811
See application file for complete search history.

(56) References Cited

U.S. PATENT DOCUMENTS 10,505,700 B1   12/2019   Lan et al.
12,228,655 B1 *  2/2025   MacGougan .......... H01Q 1/241
(Continued)

FOREIGN PATENT DOCUMENTS

CN   101304580 A   11/2008
CN   103560801 A    2/2014
(Continued)

OTHER PUBLICATIONS

Pei Zhao et al., "Indoor wireless communication technology and engineering practice principles." Beijing University of Posts and Telecommunications Press, p. 203, 2015.

*Primary Examiner* — Dai Phuong
(74) *Attorney, Agent, or Firm* — Cooper Legal Group, LLC

(57) ABSTRACT

A wireless signal receiving device and system are provided. The wireless signal receiving device includes: a plurality of antennas for receiving a first wireless signal, a second wireless signal and an external antenna wireless signal; a first signal splitting device for splitting the external antenna wireless signal into a third wireless signal and a fourth wireless signal in different frequency bands; a first signal switching device for individually switching and outputting wireless signals; a second signal switching device for individually switching and outputting wireless signals; a first module switching device for switching output routes of wireless signals; a second module switching device for switching output routes of wireless signals; and a first signal combination device for combining wireless signals into a fifth wireless signal.

18 Claims, 2 Drawing Sheets

(51) Int. Cl.
*H04B 1/16* (2006.01)
*H04B 1/3805* (2015.01)

(52) U.S. Cl.
CPC .... *H04B 1/3805* (2013.01); *H04B 2001/3811* (2013.01)

(56) References Cited

U.S. PATENT DOCUMENTS

| | | | |
|---|---|---|---|
| 2003/0125001 A1 | 7/2003 | Kushihi | |
| 2006/0121870 A1* | 6/2006 | Chu | H04B 1/3805 455/552.1 |
| 2006/0152408 A1* | 7/2006 | Leinonen | H04B 1/1027 455/88 |
| 2008/0055172 A1* | 3/2008 | Chen | H01Q 21/30 343/729 |
| 2011/0249760 A1 | 10/2011 | Chrisikos et al. | |
| 2018/0123632 A1 | 5/2018 | Posselt et al. | |
| 2019/0364612 A1 | 11/2019 | Lan et al. | |
| 2020/0132855 A1* | 4/2020 | Lee | G01S 19/22 |
| 2020/0244408 A1 | 7/2020 | Kim et al. | |
| 2021/0135690 A1 | 5/2021 | Pehlke | |

FOREIGN PATENT DOCUMENTS

| | | |
|---|---|---|
| CN | 104092526 A | 10/2014 |
| CN | 105655713 A | 6/2016 |
| CN | 106033840 A | 10/2016 |
| CN | 106100686 A | 11/2016 |
| CN | 106330220 A | 1/2017 |
| CN | 106450757 A | 2/2017 |
| CN | 108233948 A | 6/2018 |
| CN | 108832988 A | 11/2018 |
| CN | 109756238 A | 5/2019 |
| CN | 112164893 A | 1/2021 |
| CN | 112714415 A | 4/2021 |
| KR | 20050028688 A | 3/2005 |
| KR | 100895795 B1 | 4/2009 |
| TW | 201611410 A | 3/2016 |
| WO | WO2017071331 A1 | 5/2017 |
| WO | WO2020/046180 A1 | 3/2020 |

* cited by examiner

WIRELESS SIGNAL RECEIVING DEVICE AND SYSTEM

The application claims priority to U.S. Provisional Application No. 63/255,866, filed on Oct. 14, 2021, the disclosure of which is hereby incorporated by reference herein in its entirety.

BACKGROUND OF THE INVENTION

Field of the Invention

The present invention relates to a wireless signal receiving device and system and, more particularly, to a wireless signal receiving device and system, which receive wireless signals in multiple different bands by multiple antennas to switch and output the wireless signals to different wireless network modules.

Description of the Prior Art

Currently, due to considerations of circuit design space, wireless wide area network (WWAN) modules provided by manufacturers are designed to receive Global Positioning System (GPS) wireless signals and WWAN AUX wireless signals in an integrated manner.

However, if GPS wireless signals and WWAN wireless signals are received together, the GPS wireless signals are interfered, causing degraded reception quality of the GPS wireless signals.

Moreover, regarding GPS applications in industry, wireless signals in the L5 band are added on top of the wireless signals of the original L1 band. With the wireless signals of the newly added L5 band, GPS positioning errors have become lower and accuracy is also enhanced.

SUMMARY OF THE INVENTION

In view of the above, the present invention provides a wireless signal receiving device and system. The wireless signal receiving device and system are capable of receiving a plurality of wireless signals including different bands by a plurality of antennas, performing signal processing such as signal splitting and signal amplification on the wireless signals including the different bands, selectively switching by a signal switching device to the wireless signals to be output, selecting by a module switching device a wireless network module to which the wireless signals are to be fed, and combining the wireless signals according to module requirements or directly feeding the wireless signals to the selected wireless network module.

A wireless signal receiving device provided by the present invention includes: a first antenna, for receiving a first wireless signal in a Global Positioning System (GPS) L1 band; a second antenna, for receiving a second signal in a GPS L5 band; a third antenna, for receiving an external antenna wireless signal including the GPS L1 band and the GPS L5 band; a first signal splitting device, coupled to the third antenna, for splitting the external antenna wireless signal into a third wireless signal in the GPS L1 band and a fourth wireless signal in the GPS L5 band; a first signal switching device, coupled to the first antenna, coupled to the first signal splitting device, for individually switching and outputting the first wireless signal and the third wireless signal; a second signal switching device, coupled to the second antenna, coupled to the first signal splitting device, for individually switching and outputting the second wireless signal and the fourth wireless signal; a first module switching device, coupled to the first signal switching device, for switching an output route of the first wireless signal or the third wireless signal; a second module switching device, coupled to the second signal switching device, for switching an output route of the second wireless signal or the fourth wireless signal; and a first signal combination device, coupled to the first module switching device and the second module switching device, for combining the wireless signals received from the first module switching device and the second module switching device into a fifth wireless signal.

In one embodiment of the present invention, the wireless signal receiving device above further includes: a fourth antenna, for receiving a sixth wireless signal including a wireless wide area network (WWAN) band (for example, the sixth wireless signal may include a WWAN 3300 MHz to 5950 MHz band and a WWAN 617 MHz to 2690 MHz band); a first diplexer, coupled to the fourth antenna, for receiving the sixth wireless signal; and a second signal combination device, coupled to the first diplexer and the first module switching device, for combining the wireless signals received from the first module switching device and the first diplexer into a seventh wireless signal.

In one embodiment of the present invention, the wireless signal receiving device above further includes: a first low-noise amplifier (LNA), coupled to the first antenna, coupled to the first signal switching device, for receiving the first wireless signal; and a second LNA, coupled to the second antenna, coupled to the second signal switching device, for receiving the second wireless signal.

In one embodiment of the present invention, the wireless signal receiving device above further includes: a first diplexer, coupled to the first antenna, for receiving a wireless signal of the first antenna; and an extractor, coupled to the first diplexer, coupled to the first signal switching device, for receiving a wireless signal of the first diplexer; wherein the first antenna is further for receiving the sixth wireless signal including the WWAN band.

In one embodiment of the present invention, the wireless signal receiving device above further includes: a second diplexer, coupled to the second antenna, for receiving a wireless signal of the second antenna; and a third diplexer, coupled to the second diplexer and the second module switching device, for receiving wireless signals of the second module switching device and the second diplexer; wherein the second antenna is further for receiving a multi-input multi-output (MIMO) wireless signal including the WWAN band.

In one embodiment of the present invention, a band of the first wireless signal in the wireless signal receiving device further includes a WWAN 617 MHz to 5950 MHz band, and a band of the second wireless signal further includes a WWAN 617 MHz to 5000 MHz band.

A wireless signal receiving system provided by the present invention includes: a first antenna, for receiving a first wireless signal in a Global Positioning System (GPS) L1 band; a second antenna, for receiving a second wireless signal in a GPS L5 band; a third antenna, for receiving an external antenna wireless signal including the GPS L1 band and the GPS L5 band; a first signal splitting device, coupled to the third antenna, for splitting the external antenna wireless signal into a third wireless signal in the GPS L1 band and a fourth wireless signal in the GPS L5 band; a first signal switching device, coupled to the first antenna, coupled to the first signal splitting device, for individually switching and outputting the first wireless signal and the third wireless signal; a second signal switching device, coupled to the second antenna, coupled to the first signal splitting device, for individually switching and outputting the second wireless signal and the fourth wireless signal; a first module switching device, coupled to the first signal switching device and a first signal combination device, for switching an output route of the first wireless signal or the third wireless signal; a second module switching device, coupled to the second signal switching device and the first signal combination device, for switching an output route of the second wireless signal or the fourth wireless signal; the first signal combination device, coupled to the first module switching device and the second module switching device, for combining the wireless signals received from the first module switching device and the second module switching device into a fifth wireless signal; a single-feed GPS module, coupled to the first signal combination device, for receiving the fifth wireless signal; a dual-feed WWAN module, coupled to the first signal combination device, coupled to the second module switching device, for receiving wireless signals of the first signal combination device and the second module switching device.

In one embodiment of the present invention, the wireless signal receiving system above further includes: a fourth antenna, for receiving a sixth wireless signal including a wireless wide area network (WWAN) band (for example, the sixth wireless signal may include a WWAN 3300 MHz to 5950 MHz band and a WWAN 617 MHz to 2690 MHz band); a first diplexer, coupled to the fourth antenna, for receiving the sixth wireless signal; and a second signal combination device, coupled to the first diplexer and the first module switching device, for combining the wireless signals received from the first module switching device and the first diplexer into a seventh wireless signal; wherein the dual-feed WWAN module is further for receiving the seventh wireless signal.

In one embodiment of the present invention, the wireless signal receiving system above further includes: a first low-noise amplifier (LNA), coupled to the first antenna, coupled to the first signal switching device, for receiving the first wireless signal; and a second LNA, coupled to the second antenna, coupled to the second signal switching device, for receiving the second wireless signal.

In one embodiment of the present invention, the wireless signal receiving system above further includes: a first diplexer, coupled to the first antenna, for receiving a wireless signal of the first antenna; and an extractor, coupled to the first diplexer, coupled to the first signal switching device, for receiving a wireless signal of the first diplexer; wherein the first antenna is further for receiving the sixth wireless signal including the WWAN band.

In one embodiment of the present invention, the wireless signal receiving system above further includes: a second diplexer, coupled to the second antenna, for receiving a wireless signal of the second antenna; and a third diplexer, coupled to the second diplexer and the second module switching device, for receiving wireless signals of the second module switching device and the second diplexer; wherein the second antenna is further for receiving a multi-input multi-output (MIMO) wireless signal including the WWAN band, and the dual-feed WWAN module is further for receiving a wireless signal of the third diplexer.

In one embodiment of the present invention, in the wireless signal receiving system and the wireless signal receiving device above, the first signal splitting device is a triplexer.

In one embodiment of the present invention, in the wireless signal receiving system and the wireless signal receiving device above, the first signal combination device is a triplexer.

In one embodiment of the present invention, in the wireless signal receiving system and the wireless signal receiving device above, the second signal combination device includes a diplexer and an extractor.

In one embodiment of the present invention, a band of the first wireless signal in the wireless signal receiving system further includes a WWAN 617 MHz to 5950 MHz band, and a band of the second wireless signal further includes a WWAN 617 MHz to 5000 MHz band.

In conclusion, the present invention is capable of receiving a plurality of wireless signals including different bands (for example, the L1 band and the L5 band) by a plurality of antennas, performing signal processing such as signal splitting and signal amplification on the wireless signals including the different bands, selectively switching by the signal switching device to the wireless signals to be output, selecting by the module switching device the wireless network module to which the wireless signals are to be fed, and combining the wireless signals according to module requirements or directly feeding the wireless signals to the selected wireless network module. With the functional structure above, while reducing interference caused by wireless signals in the WWAN band upon GPS wireless signals, the present invention further additionally provides reception of wireless signals in the GPS L5 band, hence further enhancing positioning accuracy and reducing errors of the GPS. Moreover, the wireless network module to which wireless signals are to be fed can be selected by the module switching device, and so a user is provided with output options of a plurality of wireless network modules in case of unstable wireless signals, hence improving system stability.

To better and more readily understand the above and other objects, features and advantages of the present invention, embodiments are described in detail with the accompanying drawings below.

DETAILED DESCRIPTION OF THE EMBODIMENTS

Figure 1:
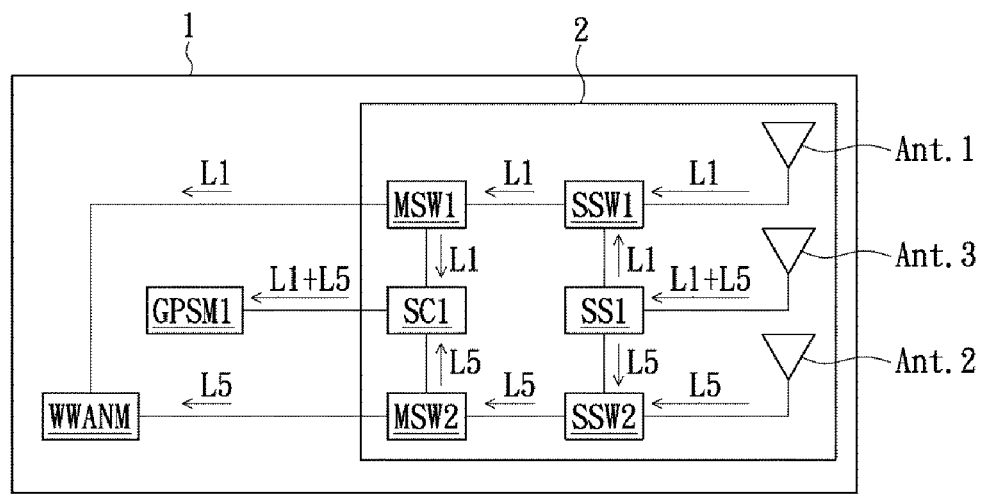
FIG. 1 is a block diagram of a wireless signal receiving system provided according to an embodiment of the present invention.

Refer to FIG. 1 showing a block diagram of a wireless signal receiving system provided according to an embodiment of the present invention.

In this embodiment, a wireless signal receiving system 1 of the present invention includes a wireless signal receiving device 2, a first Global Positioning System (GPS) module GPSM1, and a dual-feed wireless wide area network (WWAN) module WWANM. The wireless signal receiving device 2 includes a first antenna Ant.1, a second antenna Ant.2, a third antenna Ant.3, a first signal splitting device SS1, a first signal switching device SSW1, a second signal switching device SSW2, a first module switching device MSW1, a second module switching device MSW2 and a first signal combination device SC1. The first antenna Ant.1 is coupled to the first signal switching device SSW1. The second antenna Ant.2 is coupled to the second signal switching device SSW2. The first signal splitting device SS1 is coupled to the third antenna Ant.3, the first signal switching device SSW1 and the second signal switching device SSW2. The first module switching device MSW1 is coupled to the first signal combination device SC1, the first signal switching device SSW1 and the dual-feed WWAN module WWANM. The second module switching device MSW2 is coupled to the first signal combination device SC1, the second signal switching device SSW2 and the dual-feed WWAN module WWANM. The first signal combination device SC1 is coupled to the first GPS module GPSM1.

In the wireless signal receiving system 1 of the present invention, the first antenna Ant.1 receives a first wireless signal in a GPS L1 band (alternatively, only/further including a WWAN 617 MHz to 5950 MHz band), the second antenna Ant.2 receives a second wireless signal in a GPS L5 band (alternatively, only/further including a WWAN 617 MHz to 5000 MHz band), and the third antenna Ant.3 receives an external antenna wireless signal including the GPS L1 band and the GPS L5 band. Next, the first signal splitting device SS1 splits the external antenna wireless signal received by the third antenna Ant.3 into a third wireless signal in the GPS L1 band and a fourth wireless signal in the GPS L5 band. Then, the first signal switching device SSW1 individually switches and outputs the first wireless signal and the third wireless signal in the GPS L1 band (alternatively, only/further including the WWAN 617 MHz to 5950 MHz band) to the first module switching device MSW1, and the second signal switching device SSW2 individually switches and outputs the second wireless signal and the fourth wireless signal in the GPS L5 band (alternatively, only/further including the WWAN 617 MHz to 5000 MHz band) to the second module switching device MSW2. The first module switching device MSW1 switches an output route of the first wireless signal or the third wireless signal in the GPS L1 band (alternatively, only/further including the WWAN 617 MHz to 5950 MHz band), and the second module switching device MSW2 switches an output route of the second wireless signal or the fourth wireless signal in the GPS L5 band (alternatively, only/further including the WWAN 617 MHz to 5000 MHz band). When the dual-feed WWAN module WWANM is selected for outputting, the first module switching device MSW1 and the second module switching device MSW2 directly feed wireless signals into the dual-feed WWAN module WWANM. When the first GPS module GPSM1 is selected for outputting, the first module switching device MSW1 and the second module switching device MSW2 output wireless signals to the first signal combination device SC1, and the first signal combination device SC1 combines wireless signals received from the first module switching device MSW1 and the second module switching device MSW2 into a fifth wireless signal, and feeds the fifth wireless signal including the GPS L1 band and the GPS L5 band (alternatively, only/further including the WWAN 617 MHz to 5950 MHz band, and the WWAN 617 MHz to 5000 MHz band) to the first GPS module GPSM1.

In the wireless signal receiving system 1 of the present invention, the first antenna Ant.1 serving as an internal antenna is coupled to the first signal switching device SSW1, and is for receiving the first wireless signal in the GPS L1 band of a single band (alternatively, only/further including the WWAN 617 MHz to 5950 MHz band), and transmitting the first wireless signal in the GPS L1 band of a single band to the first signal switching device SSW1.

In the wireless signal receiving system 1 of the present invention, the second antenna Ant.2 serving as an internal antenna is coupled to the second signal switching device SSW2, and is for receiving the second wireless signal in the GPS L5 band of a single band (alternatively, only/further including the WWAN 617 MHz to 5000 MHz band), and transmitting the second wireless signal in the GPS L5 band of a single band to the second signal switching device SSW2.

In the wireless signal receiving system 1 of the present invention, the third antenna Ant.3 serving as an external antenna is coupled to the first signal splitting device SS1, and is for receiving the external antenna wireless signal including the GPS L1 band and L5 band, and transmitting the external antenna wireless signal including the GPS L1 band and L5 band to the first signal splitting device SS1.

In the wireless signal receiving system 1 of the present invention, the first signal splitting device SS1 is coupled to the third antenna Ant.3, the first signal switching device SSW1 and the second signal switching device SSW2, and is for splitting the external antenna wireless signal including the GPS L1 band and L5 band into the third wireless signal in the GPS L1 band and the fourth wireless signal in the GPS L5 band, and transmitting the third wireless signal in the GPS L1 band and the fourth wireless signal in the GPS L5 band to the first signal switching device SSW1 and the second signal switching device SSW2, respectively. In one embodiment, the signal splitting device SS1 is a triplexer; however, the present invention is not limited to the example above. Any device capable of splitting the external antenna wireless signal including the GPS L1 band and L5 band into wireless signals in the GPS L1 band and GPS L5 band can be used as the signal splitting device SS1 of the wireless signal receiving system 1 of the present invention.

In the wireless signal receiving system 1 of the present invention, the first signal switching device SSW1 is coupled to the first antenna Ant.1, the first signal splitting device SS1 and the first module switching device MSW1, and is for individually switching and outputting the first wireless signal in the GPS L1 band (alternatively, only/further including the WWAN 617 MHz to 5950 MHz band) and the third wireless signal in the GPS L1 band. For example, the first signal switching device SSW1 receives the first wireless signal in the GPS L1 band from the first antenna Ant.1 and the third wireless signal in the GPS L1 band from the first signal splitting device SS1, and selectively switches and outputs the first wireless signal in the GPS L1 band to the first module switching device MSW1, or selectively switches and outputs the third wireless signal in the GPS L1 band to the first module switching device MSW1. That is, at a same time point, the first signal switching device SSW1 outputs only one wireless signal (the first wireless signal or the third wireless signal) to the first module switching device MSW1. The selecting and switching of the first signal switching device SSW1 can be performed manually by a user, or the wireless signal to be output can be switched by software, hardware or firmware; the present invention is not limited to the examples above.

In the wireless signal receiving system 1 of the present invention, the second signal switching device SSW2 is coupled to the second antenna Ant.2, the first signal splitting device SS1 and the second module switching device MSW2, and is for individually switching and outputting the second wireless signal in the GPS L5 band (alternatively, only/further including the WWAN 617 MHz to 5000 MHz band)

and the fourth wireless signal in the GPS L5 band. For example, the second signal switching device SSW2 receives the second wireless signal in the GPS L5 band from the second antenna Ant.2 and the fourth wireless signal in the GPS L5 band from the first signal splitting device SS1, and selectively switches and outputs the second wireless signal in the GPS L5 band to the second module switching device MSW2, or selectively switches and outputs the fourth wireless signal in the GPS L5 band to the second module switching device MSW2. That is, at a same time point, the second signal switching device SSW2 outputs only one wireless signal (the second wireless signal or the fourth wireless signal) to the second module switching device MSW2. The selecting and switching of the second signal switching device SSW2 can be performed manually by a user, or the wireless signal to be output can be switched by software, hardware or firmware; the present invention is not limited to the examples above.

In the wireless signal receiving system 1 of the present invention, the first module switching device MSW1 is coupled to the first signal switching device SSW1, the first signal combination device SC1 and the dual-feed WWAN module WWANM, and is for switching the output route of the first wireless signal or the third wireless signal. For example, the first module switching module MSW1 receives the first wireless signal or the third wireless signal in the GPS L1 band (alternatively, only/further including the WWAN 617 MHz to 5950 MHz band) from the first signal switching device SSW1, and selectively switches and outputs the first wireless signal or the third wireless signal in the GPS L1 band to the first signal combination device SC1, or selectively switches and outputs the first wireless signal or the third wireless signal in the GPS L1 band to the dual-feed WWAN module WWANM. The selecting and switching of the first module switching device MSW1 can be performed manually by a user, or the wireless network module to perform outputting can be switched by software, hardware or firmware; the present invention is not limited to the examples above.

In the wireless signal receiving system 1 of the present invention, the second module switching device MSW2 is coupled to the second signal switching device SSW2, the first signal combination device SC1 and the dual-feed WWAN module WWANM, and is for switching the output route of the second wireless signal or the fourth wireless signal. For example, the second module switching device MSW2 receives the second wireless signal or the fourth wireless signal in the GPS L5 band (alternatively, only/further including the WWAN 617 MHz to 5000 MHz band) from the second signal switching device SSW2, and selectively switches and outputs the second wireless signal or the fourth wireless signal in the GPS L5 band to the first signal combination device SC1, or selectively switches and outputs the second wireless signal or the fourth wireless signal in the GPS L5 band to the dual-feed WWAN module WWANM. The selecting and switching of the second module switching device MSW2 can be performed manually by a user, or the wireless network module to perform outputting can be switched by software, hardware or firmware; the present invention is not limited to the examples above.

In the wireless signal receiving system 1 of the present invention, the first signal combination device SC1 is coupled to the first GPS module GPSM1, the first module switching device MSW1 and the second module switching device MSW2, and is for combining wireless signals received from the first module switching device MSW1 and the second module switching device MSW2 into a fifth wireless signal. For example, the first signal combination device SC1 receives the first wireless signal or third wireless signal in the GPS L1 band (alternatively, only/further including the WWAN 617 MHz to 5950 MHz band) from the first module switching device MSW1, and the second wireless signal or fourth wireless signal in the GPS L5 band (alternatively, only/further including the WWAN 617 MHz to 5000 MHz band) from the second module switching device MSW2, combines the wireless signals received from the first module switching device MSW1 and the second module switching device MSW2 into the fifth wireless signal including the GPS L1 band and the GPS L5 band, and outputs the fifth wireless signal including the GPS L1 band and the GPS L5 band (alternatively, only/further including the WWAN 617 MHz to 5950 MHz band, and the WWAN 617 MHz to 5000 MHz band) to the first GPS module GPSM1. In one embodiment, the first signal combination device SC1 is a triplexer; however, the present invention is not limited to the example above. Any device capable of combining wireless signals received from the first module switching device MSW1 and the second module switching device MSW2 into a wireless signal including the GPS L1 band and the GPS L5 band (alternatively, only/further including the WWAN 617 MHz to 5950 MHz band, and the WWAN 617 MHz to 5000 MHz band) can be used as the first signal combination device SC1 of the wireless signal receiving system 1 of the present invention. The first GPS module GPSM1 may also be a WWAN module; the present invention is not limited to the example above.

In the wireless signal receiving system 1 of the present invention, the first GPS module GPSM1 is coupled to the first signal combination device SC1, and is for receiving the fifth wireless signal including the GPS L1 band and the GPS L5 band (alternatively, only/further including the WWAN 617 MHz to 5950 MHz band, and the WWAN 617 MHz to 5000 MHz band) from the first signal combination device SC1, and providing a user, within a network coverage range of the first GPS module GPSM1, the fifth wireless signal as a wireless network signal source for the use of a wireless network. The first GPS module GPSM1 is a single-feed GPS module; that is to say, the first GPS module GPSM1 has only one input port for wireless signals. The wireless signal receiving system 1 of the present invention can combine a plurality of wireless signals into one single input source (the fifth wireless signal) by the first signal combination device SC1, and feed the fifth wireless signal into the first GPS module GPSM1 for use as a wireless network signal input source.

In the wireless signal receiving system 1 of the present invention, the dual-feed WWAN module WWANM is coupled to the first module switching device MSW1 and the second module switching device MSW2, and is for receiving wireless signals of the first module switching device MSW1 and the second module switching device MSW2, and providing a user, within the network coverage range of the dual-feed WWAN module WWANM, the wireless signals of the first module switching device MSW1 and the second module switching device MSW2 as a wireless network signal source for the user of a wireless network. The dual-feed WWAN module WWANM has two input ports for wireless signals. The wireless signal receiving system 1 of the present invention can directly feed the wireless signals (the first wireless signal, the second wireless signal, the third wireless signal and the fourth wireless signal) of the first module switching device MSW1 and the second module switching device MSW2 into the dual-feed WWAN module WWANM for use as a wireless network signal input source.

Figure 2:
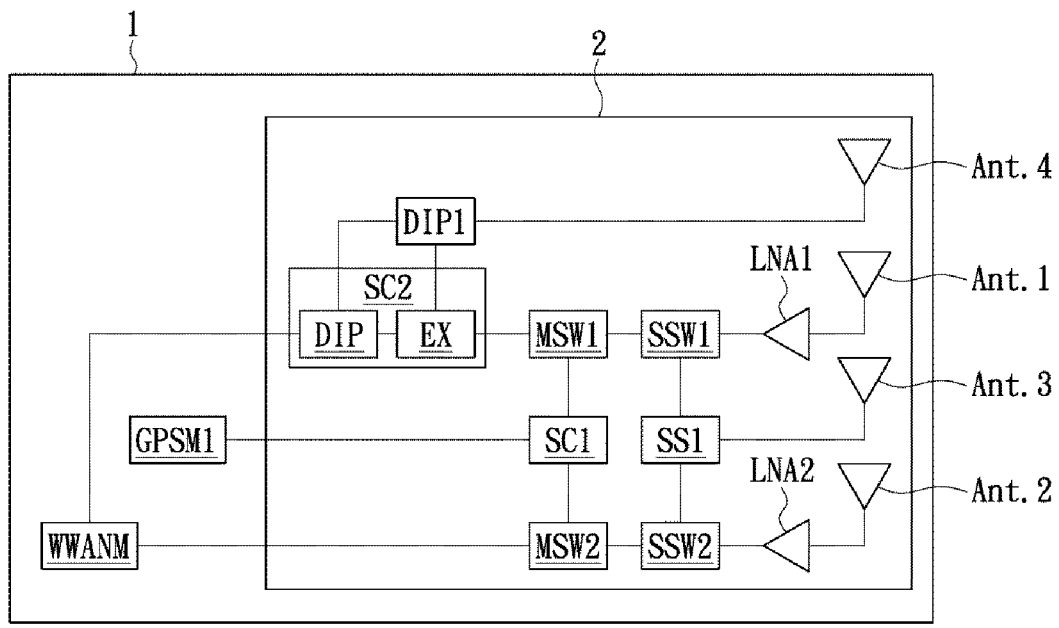
FIG. 2 is a block diagram of a wireless signal receiving system provided according to another embodiment of the present invention.

Refer to FIG. 2 showing a block diagram of a wireless signal receiving system provided according to another embodiment of the present invention.

In this embodiment, a wireless signal receiving system 1 of the present invention includes a wireless signal receiving device 2, a first GPS module GPSM1, and a dual-feed WWAN module WWANM. The wireless signal receiving device 2 includes a first antenna Ant.1, a second antenna Ant.2, a third antenna Ant.3, a fourth antenna Ant.4, a first low-noise amplifier (LNA) LNA1, a second LNA LNA2, a first diplexer DIP1, a first signal splitting device SS1, a first signal switching device SSW1, a second signal switching device SSW2, a first module switching device MSW1, a second module switching device MSW2, a first signal combination device SC1 and a second signal combination device SC2. The first antenna Ant.1 is coupled to the first LNA LNA1. The second antenna Ant.2 is coupled to the second LNA LNA2. The first signal splitting device SS1 is coupled to the third antenna Ant.3, the first signal switching device SSW1 and the second signal switching device SSW2. The fourth antenna Ant.4 is coupled to the first diplexer DIP1. The first diplexer DIP1 is coupled to the second signal combination device SC2. The first signal switching device SSW1 is coupled to the first LNA LNA1. The second signal switching device SSW2 is coupled to the second LNA LNA2. The first module switching device MSW1 is coupled to the first signal combination device SC1, the second signal combination device SC2 and the first signal switching device SSW1. The second module switching device MSW2 is coupled to the first signal combination device SC1, the second signal switching device SSW2 and the dual-feed WWAN module WWANM. The first signal combination device SC1 is coupled to the first GPS module GPSM1. The second signal combination device SC2 is coupled to the dual-feed WWAN module WWANM.

In the wireless signal receiving system 1 of the present invention, the third antenna Ant.3, the first signal splitting device SS1, the first signal combination device SC1 and the first GPS module GPSM1 have functions and connections the same as those of the foregoing embodiment, and the elements using the same symbols and numerals mean that the functions of these elements are the same as those of the foregoing embodiment. Thus, such repeated description is omitted herein, and only differences from the foregoing embodiment are described below.

In the wireless signal receiving system 1 of the present invention, the first antenna Ant.1 and the second antenna Ant.2 are similar to those of the foregoing embodiment, and differ from the foregoing embodiment in that, the first LNA LNA1 is further coupled between the first antenna Ant.1 and the first signal switching device SSW1, and the second LNA LNA2 is further coupled between the second antenna Ant.2 and the second signal switching device SSW2. In this embodiment, the first LNA LNA1 is for receiving the first wireless signal, performing signal processing such as noise filtering and signal amplification on the first wireless signal, and outputting the wireless signal having undergone the signal processing to the first signal switching device SSW1. The second LNA LNA2 is for receiving the second wireless signal, performing signal processing such as noise filtering and signal amplification on the second wireless signal, and outputting the wireless signal having undergone the signal processing to the second signal switching device SSW2.

In the wireless signal receiving system 1 of the present invention, the fourth antenna Ant.4 is coupled to the first diplexer DIP1, and is for receiving any sixth wireless signal including the WWAN band (for example, the sixth wireless signal may include a WWAN 3300 MHz to 5950 MHz band, and a WWAN 617 MHz to 2690 MHz band), and transmitting the sixth wireless signal in the WWAN band to the first diplexer DIP1.

In the wireless signal receiving system 1 of the present invention, the second signal combination device SC2 is coupled to the first diplexer DIP1, the first module switching device MSW1 and the dual-feed WWAN module WWANM, and is for combining wireless signals received from the first module switching device MSW1 and the first diplexer DIP1 into a seventh wireless signal. In this embodiment, the first diplexer DIP1 receives the sixth wireless signal from the fourth antenna Ant.4, splits the sixth wireless signal into two wireless signals in the WWAN band of different bands (for example, the WWAN 3300 MHz to 5950 MHz band and the WWAN 617 MHz to 2690 MHz band), and respectively transmitting the wireless signals split by the first diplexer DIP1 to a diplexer DIP and an extractor EX included in the second signal combination device SC2 (in one embodiment, the wireless signal in the WWAN 3300 MHz to 5950 MHz band is transmitted to the diplexer DIP, and the wireless signal in the WWAN 617 MHz to 2690 MHz band is transmitted to the extractor EX). Then, the second signal combination device SC2 combines the wireless signals from the first diplexer DIP1 and the first module switching device MSW1 by the extractor EX and filters out the wireless signal other than the wireless signal in a band to be preserved, combines the wireless signal from the other output port of the first diplexer DIP1 and the wireless signal preserved by the extractor EX by the diplexer DIP into a seventh wireless signal, and outputs the seventh wireless signal to the dual-feed WWAN module WWANM.

In this embodiment, with the above functional structure of the wireless signal receiving system 1 of the present invention, while it is ensured that the dual-feed WWAN module WWANM can utilize wireless signals in the WWAN band, interference upon GPS wireless signals can be reduced and reception quality of GPS wireless signals can be enhanced.

Figure 3:
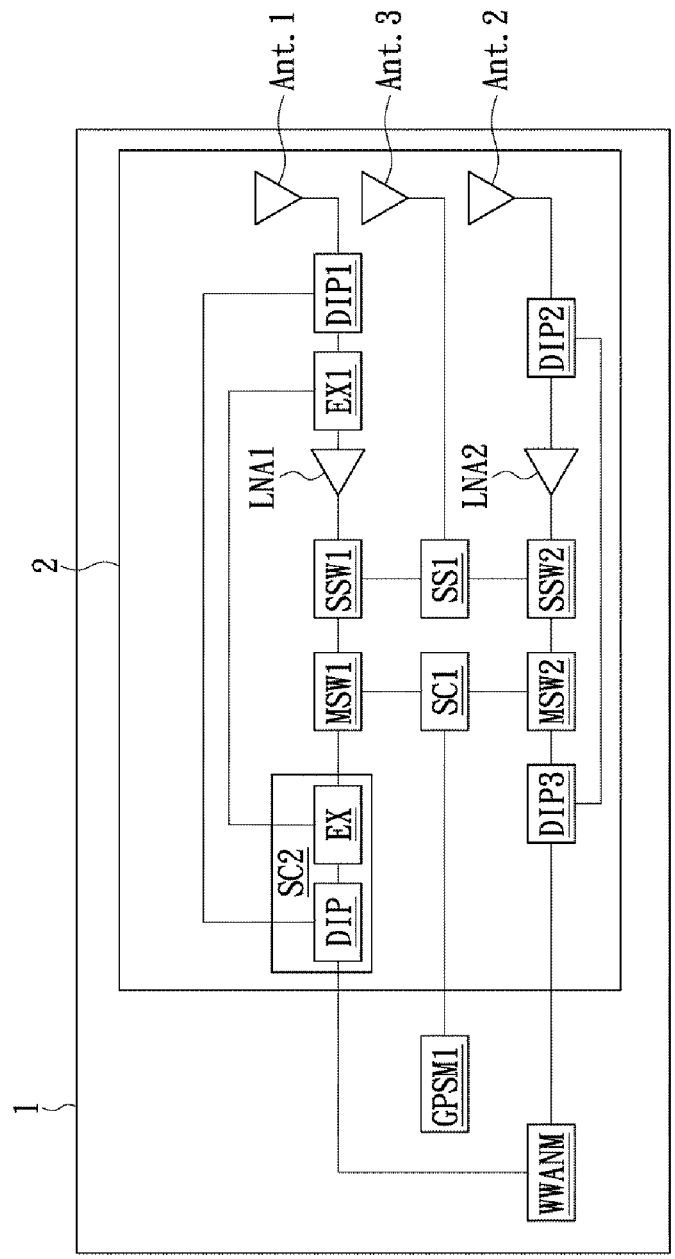
FIG. 3 is a block diagram of a wireless signal receiving system provided according to yet another embodiment of the present invention.

Refer to FIG. 3 showing a block diagram of a wireless signal receiving system provided according to yet another embodiment of the present invention.

In this embodiment, the wireless signal receiving system 1 of the present invention includes a wireless signal receiving device 2, a first GPS module GPSM1 and a dual-feed WWAN module WWANM. The wireless signal receiving device 2 includes a first antenna Ant.1, a second antenna Ant.2, a third antenna Ant.3, a first diplexer DIP1, a second diplexer DIP2, a third diplexer DIP3, a first extractor EX1, a first signal combination device SC1, a second signal combination device SC2, a first signal splitting device SS1, a first LNA LNA1, a second LNA LNA2, a first signal switching device SSW1, a second signal switching device SSW2, a first module switching device MSW1 and a second module switching device MSW2. The first diplexer DIP1 is coupled to the first antenna Ant.1, the second signal combination device SC2 and the first extractor EX1. The second diplexer DIP2 is coupled to the second antenna Ant.2, the second LNA LNA2 and the third diplexer DIP3. The first LNA LNA1 is coupled to the first extractor EX1 and the first signal switching device SSW1. The first module switching device MSW1 is coupled to the first signal switching device SSW1, the first signal combination device SC1 and the second signal combination device SC2. The second signal combination device SC2 is coupled to the first extractor EX1 and the dual-feed WWAN module WWANM. The first signal splitting device SS1 is coupled to the third antenna Ant.3, the first signal switching device SSW1 and the second signal switching device SSW2. The second signal switching device SSW2 is coupled to the second LNA LNA2 and the second module switching device MSW2. The second module switching device MSW2 is coupled to the first signal combination device SC1 and the third diplexer DIP3. The third diplexer DIP3 is coupled to the dual-feed WWAN module WWANM. The first signal combination device SC1 is coupled to the first GPS module GPSM1.

In the wireless signal receiving system 1 of the present invention, the third antenna Ant.3, the first signal splitting device SS1, the first signal combination device SC1 and the first GPS module GPSM1 have functions and connections the same as those of the foregoing embodiment, and the elements using the same symbols and numerals mean that the functions of these elements are the same as those of the foregoing embodiment. Thus, such repeated description is omitted herein, and only differences from the foregoing embodiment are described below.

In the wireless signal receiving system 1 of the present invention, the first antenna Ant.1 is coupled to the first diplexer DIP1. Compared to the foregoing embodiment, the first antenna Ant.1 is further for receiving the first wireless signal in the WWAN band (for example, the band of the first wireless signal can further include the WWAN 3300 MHz to 5950 MHz band and the WWAN 617 MHz to 2690 MHz band), the first diplexer DIP1 receives the first wireless signal from the first antenna Ant.1, and splits the first wireless signal into a wireless signal in the WWAN band and a wireless signal in the GPS L1 band (in one embodiment, the first diplexer DIP1 further splits the first wireless signal into a wireless signal in the WWAN 3300 MHz to 5950 MHz band, and a wireless signal including the WWAN 617 MHz to 2690 MHz band and the GPS L1 band). Then, the wireless signals split by the first diplexer DIP1 are respectively transmitted to the second signal combination device SC2 and the first extractor EX1 (in one embodiment, the wireless signal in the WWAN 3300 MHz to 5950 MHz band is transmitted to the diplexer of the second signal combination device SC2, and the wireless signal including the WWAN 617 MHz to 2690 MHz band and the GPS L1 band is transmitted to the first extractor EX1).

In the wireless signal receiving system 1 of the present invention, the first extractor EX1 is coupled to the second signal combination device SC2, the first LNA LNA1 and the first diplexer DIP1, and is for filtering out a wireless signal other than the wireless signal in the band to be preserved. In this embodiment, the first extractor EX1 receives the wireless signal from the first diplexer DIP1, and is for filtering out a wireless signal other than the wireless signal in the GPS L1 band (alternatively, being/or further including the WWAN 617 MHz to 5950 MHz band) from the first wireless signal (in one embodiment, a wireless signal including the WWAN 617 MHz to 2690 MHz band and the GPS L1 band is split into a wireless signal in the WWAN 617 MHz to 2690 MHz band and a wireless signal in the GPS L1 band by the first extractor EX1, the wireless signal in the WWAN 617 MHz to 2690 MHz band is transmitted to the extractor in the second signal combination device SC2, and the wireless signal in the GPS L1 band is transmitted to the first LNA LNA1), further filtering out the wireless signal other than the wireless signal in the GPS L1 band immediately after the wireless signal is split by the first diplexer DIP1, so as to ensure the quality of the wireless signal in the GPS L1 band. Thus, when the first antenna Ant.1 receives both of a wireless signal in the WWAN band and a wireless signal in the GPS L1 band, interference received by the GPS wireless signal is reduced, and the wireless signal in the GPS L1 band (alternatively, being/further including the WWAN 617 MHz to 5950 MHz band) is transmitted to the first LNA LNA1 or the second signal combination device SC2.

In the wireless signal receiving system 1 of the present invention, the first LNA LNA1 is coupled to the first antenna Ant.1 and coupled to the first extractor EX1 and the first signal switching device SSW1, and is for receiving the wireless signal from the first extractor EX1, performing signal processing such as noise filtering and signal amplification on the wireless signal from the first extractor EX1, and outputting the wireless signal having undergone the signal processing to the first signal switching device SSW1.

In the wireless signal receiving system 1 of the present invention, the second signal combination device SC2 is coupled to the first diplexer DIP1, the first extractor EX1, the first module switching device MSW1 and the dual-feed WWAN module WWANM, and is for combining wireless signals received from the first module switching device MSW1, the first extractor EX1 and the first diplexer DIP1 into a seventh wireless signal. In this embodiment, the second signal combination device SC2 combines by the extractor EX the wireless signal from the first extractor EX1 and having undergone noise filtering and signal amplification performed by the first LNA LNA1, filters out the wireless signal other than the wireless signal in the GPS L1 band, combines by the diplexer DIP the wireless signal from the other output port of the first diplexer DIP1 and the wireless signal preserved by the extractor EX into the seventh wireless signal, and outputs the seventh wireless signal to the dual-feed WWAN module WWANM. With the above functional structure of the wireless signal receiving system 1 of the present invention, when a single antenna receives a wireless signal including the WWAN band and a wireless signal in the GPS L1 band, while it is ensured that the dual-feed WWAN module WWANM can utilize wireless signals in the WWAN band, interference received by GPS wireless signals can be reduced and reception quality of GPS wireless signals can be enhanced.

In the wireless signal receiving system 1 of the present invention, the second antenna Ant.2 is coupled to the second diplexer DIP2 and coupled to the second LNA LNA2. Compared to the foregoing embodiments, the second antenna Ant.2 further receives a multi-input multi-output (MIMO) wireless signal including a WWAN band. The second diplexer DIP2 is for receiving the wireless signal of the second antenna Ant.2, splitting the wireless signal of the second antenna Ant.2 into a wireless signal in the GPS L5 band and a MIMO wireless signal in the WWAN band, and respectively transmitting the wireless signal in the GPS L5 band and the MIMO wireless signal in the WWAN band split by the second diplexer DIP2 to the second LNA LNA2 and the third diplexer DIP3. The third diplexer DIP3 then combines and outputs the MIMO wireless signal in the WWAN band and the wireless signal in the GPS L5 band having undergone noise filtering and signal amplification performed by the second LNA LNA2 to the WWAN module WWANM. With the above functional structure of the wireless signal receiving system 1 of the present invention, when a single antenna receives a MIMO wireless signal in the WWAN band and a wireless signal in the GPS L5 band, while it is ensured that the dual-feed WWAN module WWANM can utilize MIMO wireless signals in the WWAN band, interference upon GPS wireless signals can be reduced and reception quality of GPS wireless signals can be enhanced.

In conclusion, the present invention is capable of receiving a plurality of wireless signals including different bands (for example, the L1 band and the L5 band) by a plurality of antennas, performing signal processing such as signal splitting and signal amplification on the wireless signals including the different bands, selectively switching by the signal switching device to the wireless signals to be output, selecting by the module switching device the wireless network module to which the wireless signals are to be fed, and combining the wireless signals according to wireless network module requirements or directly feeding the wireless signals to the selected wireless network module. With the functional structure above, while reducing interference caused by wireless signals in the WWAN band upon GPS wireless signals, the present invention further additionally provides reception of wireless signals in the GPS L5 band, hence further enhancing positioning accuracy and reducing errors of the GPS. Moreover, the wireless network module to which wireless signals are to be fed can be selected by the module switching device, and so a user can be provided with output options of a plurality of wireless network modules in case of unstable wireless signals, hence improving system stability.

The present invention is disclosed as the embodiments above. However, these embodiments are not to be construed as limitations to the present invention. Slight modifications and variations may be made to the embodiments by a person skilled in the art without departing from the spirit and scope of the present invention. Therefore, the scope of legal protection of the present invention shall be defined by the appended claims.

What is claimed is:

1. A wireless signal receiving device, comprising:
  a first antenna, for receiving a first wireless signal in a Global Positioning System (GPS) L1 band;
  a second antenna, for receiving a second wireless signal in a GPS L5 band;
  a third antenna, for receiving an external antenna wireless signal including the GPS L1 band and the GPS L5 band;
  a first signal splitting device, coupled to the third antenna, for splitting the external antenna wireless signal into a third wireless signal in the GPS L1 band and a fourth wireless signal in the GPS L5 band;
  a first signal switching device, coupled to the first antenna, coupled to the first signal splitting device, for individually switching and outputting the first wireless signal and the third wireless signal;
  a second signal switching device, coupled to the second antenna, coupled to the first signal splitting device, for individually switching and outputting the second wireless signal and the fourth wireless signal;
  a first module switching device, coupled to the first signal switching device, for switching an output route of the first wireless signal or the third wireless signal;
  a second module switching device, coupled to the second signal switching device, for switching an output route of the second wireless signal or the fourth wireless signal; and
  a first signal combination device, coupled to the first module switching device and the second module switching device, for combining wireless signals received from the first module switching device and the second module switching device into a fifth wireless signal.

2. The wireless signal receiving device according to claim 1, further comprising:
  a fourth antenna, for receiving a sixth wireless signal including a wireless wide area network (WWAN) band;
  a first diplexer, coupled to the fourth antenna, for receiving the sixth wireless signal; and
  a second signal combination device, coupled to the first diplexer and the first module switching device, for combining wireless signals received from the first module switching device and the first diplexer into a seventh wireless signal.

3. The wireless signal receiving device according to claim 2, wherein the second signal combination device comprises a diplexer and an extractor.

4. The wireless signal receiving device according to claim 1, further comprising:
  a first low-noise amplifier (LNA), coupled to the first antenna, coupled to the first signal switching device, and for receiving the first wireless signal; and
  a second LNA, coupled to the second antenna, coupled to the second signal switching device, for receiving the second wireless signal.

5. The wireless signal receiving device according to claim 1, further comprising:
  a first diplexer, coupled to the first antenna, for receiving a wireless signal of the first antenna; and
  an extractor, coupled to the first diplexer, coupled to the first signal switching device, for receiving a wireless signal of the first diplexer;
  wherein the first antenna is further for receiving a sixth wireless signal including the WWAN band.

6. The wireless signal receiving device according to claim 1, further comprising:
  a second diplexer, coupled to the second antenna, for receiving a wireless signal of the second antenna; and
  a third diplexer, coupled to the second diplexer and the second module switching device, for receiving a wireless signal of the second module switching device and the second diplexer;
  wherein the second antenna is further for receiving a multi-input multi-output (MIMO) wireless signal including the WWAN band.

7. The wireless signal receiving device according to claim 1, wherein the first signal splitting device is a triplexer.

8. The wireless signal receiving device according to claim 1, wherein the first signal combination device is a triplexer.

9. The wireless signal receiving device according to claim 1, wherein a band of the first wireless signal further includes a WWAN 617 MHz to 5950 MHz band, and a band of the second wireless signal further includes a WWAN 617 MHz to 5000 MHz band.

10. A wireless signal receiving system, comprising:
  a first antenna, for receiving a first wireless signal in a Global Positioning System (GPS) L1 band;
  a second antenna, for receiving a second wireless signal in a GPS L5 band;
  a third antenna, for receiving an external antenna wireless signal including the GPS L1 band and the GPS L5 band;
  a first signal splitting device, coupled to the third antenna, for splitting the external antenna wireless signal into a third wireless signal in the GPS L1 band and a fourth wireless signal in the GPS L5 band;
  a first signal switching device, coupled to the first antenna, coupled to the first signal splitting device, for individually switching and outputting the first wireless signal and the third wireless signal;
  a second signal switching device, coupled to the second antenna, coupled to the first signal splitting device, for individually switching and outputting the second wireless signal and the fourth wireless signal;

a first module switching device, coupled to the first signal switching device and a first signal combination device, for switching an output route of the first wireless signal or the third wireless signal;

a second module switching device, coupled to the second signal switching device and the first signal combination device, for switching an output route of the second wireless signal or the fourth wireless signal;

a first signal combination device, coupled to the first module switching device and the second module switching device, for combining the wireless signals received from the first module switching device and the second module switching device into a fifth wireless signal;

a single-feed Global Positioning System (GPS) module, coupled to the first signal combination device, for receiving the fifth wireless signal; and a dual-feed WWAN module, coupled to the first module switching device and the second module switching device, for receiving wireless signals of the first module switching device and the second module switching device.

11. The wireless signal receiving system according to claim 10, further comprising:
a fourth antenna, for receiving a sixth wireless signal including a wireless wide area network (WWAN) band;
a first diplexer, coupled to the fourth antenna, for receiving the sixth wireless signal; and
a second signal combination device, coupled to the first diplexer and the first module switching device, for combining the wireless signals received from the first module switching device and the first diplexer into a seventh wireless signal;
wherein the dual-feed WWAN module is further for receiving the seventh wireless signal.

12. The wireless signal receiving system according to claim 10, further comprising:
a first low-noise amplifier (LNA), coupled to the first antenna, coupled to the first signal switching device, and for receiving the first wireless signal; and
a second LNA, coupled to the second antenna, coupled to the second signal switching device, for receiving the second wireless signal.

13. The wireless signal receiving system according to claim 10, further comprising:
a first diplexer, coupled to the first antenna, for receiving a wireless signal of the first antenna; and
an extractor, coupled to the first diplexer, coupled to the first signal switching device, for receiving a wireless signal of the first diplexer;
wherein the first antenna is further for receiving a sixth wireless signal including the WWAN band.

14. The wireless signal receiving system according to claim 10, further comprising:
a second diplexer, coupled to the second antenna, for receiving a wireless signal of the second antenna; and
a third diplexer, coupled to the second diplexer and the second module switching device, for receiving wireless signals of the second module switching device and the second diplexer;
wherein the second antenna is further for receiving a multi-input multi-output (MIMO) wireless signal including the WWAN band, and the dual-feed WWAN module is further for receiving a wireless signal of the third diplexer.

15. The wireless signal receiving system according to claim 10, wherein the first signal splitting device is a triplexer.

16. The wireless signal receiving system according to claim 10, wherein the first signal combination device is a triplexer.

17. The wireless signal receiving system according to claim 11, wherein the second signal combination device comprises a diplexer and an extractor.

18. The wireless signal receiving system according to claim 10, wherein a band of the first wireless signal further includes a WWAN 617 MHz to 5950 MHz band, and a band of the second wireless signal further includes a WWAN 617 MHz to 5000 MHz band.

* * * * *